United States Patent [19]

Krieger

[11] Patent Number: 5,039,172
[45] Date of Patent: Aug. 13, 1991

[54] PROTECTIVE WHEEL COVER

[75] Inventor: Paul A. Krieger, Olmsted Falls, Ohio

[73] Assignee: The Excello Specialty Co., Cleveland, Ohio

[21] Appl. No.: 440,343

[22] Filed: Nov. 22, 1989

[51] Int. Cl.⁵ .............................................. B60B 7/00
[52] U.S. Cl. .................. 301/37 R; 118/505; 301/108 R
[58] Field of Search .............. 301/37 R, 37 P, 37 T, 301/108 R, 108 A; 118/504, 505; 150/154

[56] References Cited

U.S. PATENT DOCUMENTS

| | | | |
|---|---|---|---|
| 2,279,704 | 4/1942 | Davenport | 301/37 R |
| 2,639,948 | 5/1953 | Grimshaw | 301/37 R |
| 2,996,041 | 8/1961 | Carpenter et al. | 118/505 |
| 3,854,448 | 12/1974 | Kromanaker | 118/505 |
| 4,344,654 | 8/1982 | Apezynski | 301/37 R |

FOREIGN PATENT DOCUMENTS

| | | | |
|---|---|---|---|
| 2458968 | 1/1985 | France | 301/37 R |
| 275405 | 6/1930 | Italy | 301/37 R |

Primary Examiner—Russell D. Stormer
Attorney, Agent, or Firm—Fay, Sharpe, Beall, Fagan, Minnich & McKee

[57] ABSTRACT

A protective cover for installation to a vehicle wheel to prevent dirt, dust or foreign substances from entering through openings in the wheel into brake assemblies carried by the wheel is disclosed as comprising a relatively thin, flexible, dirt impervious planar sheet of plastic film having a circular outer periphery sized to substantially cover the wheel. A plurality of closely spaced, relatively small corrugations are formed in the sheet and extend in a circular pattern spaced radially inwardly of the outer periphery to permit the central portion of the sheet to be selectively deflected laterally of the plane of the periphery. Pressure sensitive adhesive is carried by the sheet in a circular area which is generally concentric with the outer periphery and lies radially outwardly of the corrugations.

14 Claims, 3 Drawing Sheets

PROTECTIVE WHEEL COVER

BACKGROUND OF THE INVENTION

The subject invention pertains to the art of shields and protective devices and, more particularly, to a protective cover for use on vehicle wheels to prevent entry of dirt and foreign matter through wheel openings into the brake assemblies associated with the wheels.

The invention is particularly intended for temporary application and use on newly manufactured automobiles to prevent entry of dirt and foreign matter during transportation and storage; however, as will become apparent, the invention is capable of broader application and could be used on the wheels of other vehicles and at other times.

Many current automotive wheels are designed with decorative through openings and cooling air openings which provide access through the wheels into the area of the associated disk brakes. As a consequence, during transportation and storage of the vehicles, dirt and foreign matter can enter into and build-up in the disk brake area. During normal operation of the vehicles such dirt build-up is not possible because the dirt is thrown from the wheels during rotation. However, during transportation and storage the vehicles are not being operated and the dirt is not thrown from the wheels. Sometimes it can build-up to an undesirable extent which can result in damage to the brakes when the vehicle is subsequently operated.

As a result of the above, there has been an ongoing need for some way of protecting vehicle wheels from the entry of dirt and debris during periods of extended storage and shipment. The subject invention meets this need and provides a protective wheel cover which can be quickly and easily installed at the completion of vehicle manufacture and which is capable of shielding the wheels against the entry of foreign matter for an extended period of time.

BRIEF STATEMENT OF THE INVENTION

In accordance with one aspect of the invention, a protective cover is provided for installation to a vehicle wheel to prevent dirt, dust or other foreign substances from entering through openings in the wheel into brake assemblies carried by the wheel. The cover of the invention preferably comprises a relatively thin, flexible and dirt impervious planar sheet of plastic film having a circular outer periphery sized to substantially cover the wheel. A strip of pressure sensitive adhesive is applied circumferentially of the sheet to permit the cover to be releasably affixed to the wheel to sealingly overlie the wheel and prevent entry through wheel openings into the brake assembly. Preferably, the cover member includes an integral and radially extending finger tab portion located on the circular periphery of the sheet outwardly of the pressure sensitive adhesive for permitting ready installation and removal of the cover.

In accordance with a further aspect of the invention, there are preferably a plurality of closely spaced, relatively small corrugations formed in the sheet to extend about the sheet in a circular pattern spaced radially of the outer periphery to permit the central portion of the sheet to be selectively deflected laterally of the plane of the periphery so that the cover can better conform to the shape of the wheel. Also, in one embodiment a second area of pressure sensitive adhesive is preferably located inwardly of the corrugated area. This permits the center portion of the sheet to be firmly affixed to the center section of the wheel at a location inwardly of the wheel openings.

The temporary wheel covers of the type under consideration can readily be applied to the wheels at the time of the manufacture and can remain in place throughout shipping and transportation. Preferably, the plastic from which the covers are made is highly resistant to ultraviolet radiation and does not become brittle or crack during normal periods of use.

Covers of the type under consideration can be manufactured and formed in multiple packs for ready storage and handling. Additionally, instructions and other indicia can be printed on the individual covers to facilitate their use and removal.

As is apparent from the foregoing, a primary object of the invention is the provision of a simple and relatively inexpensive protective cover which is easy to install and remove.

A still further object is the provision of a wheel cover of the type under consideration wherein the cover is capable of fitting a variety of wheel types and styles because of the cover's ability to have its center portion deflected laterally in or out relative to the cover periphery.

A still further object of the invention is the provision of a wheel cover of the type described which can be shipped and stored in multiple layer packs.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED AND MODIFIED EMBODIMENTS

Figure 3:
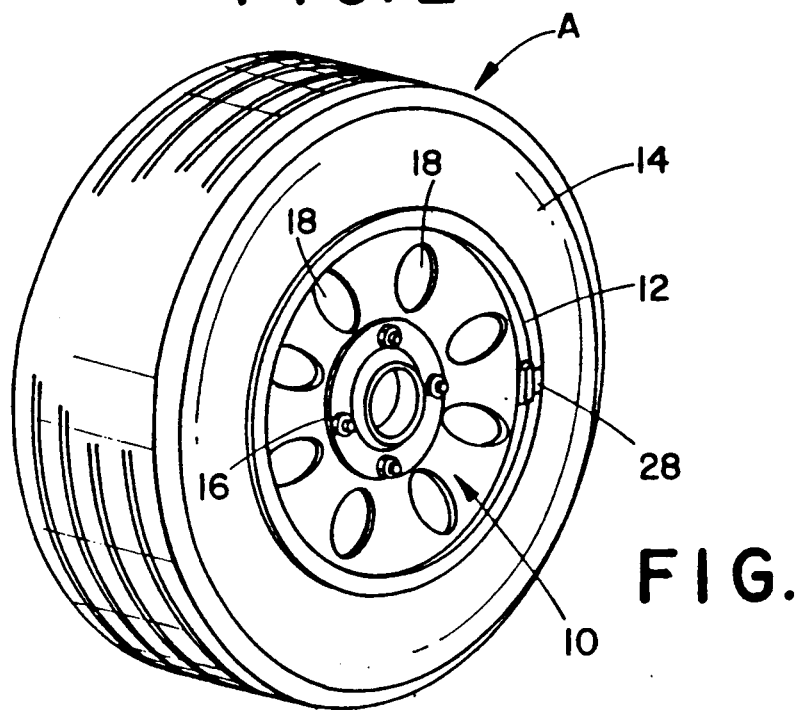
FIG. 3 is pictorial view of a typical automobile wheel assembly with a protective cover of the type shown in FIGS. 1 and 2 affixed thereto.

Referring more particularly to the drawings wherein the showings are for the purpose of illustrating preferred and alternate embodiments of the invention only, and not for the purpose of limiting same, FIG. 3 generally illustrates a vehicle wheel assembly A comprising a central metal wheel member 10 having a radially and axially extending rim section 12 which engages and retains a conventional tubeless tire 14 thereon. As is customary, the wheel is adapted to be releasably connected to the vehicle axle and hub assembly through suitable lug nuts 16.

As is often the case, the wheel 10 is provided with a plurality of openings 18 which extend through the central disk portion of the wheel 10. The openings 18 may be for decorative purposes or for permitting free access of cooling air to the disk brake assemblies associated with the wheel.

During shipment and storage of newly manufactured vehicles, there are sometimes extended periods when the vehicles are not operated and are subject to dirty environmental conditions. Under such conditions, dirt, debris and foreign matter can enter through the openings 12 and build up in and around the brake assemblies. During normal operation of the vehicles, such dirt and debris would be thrown radially outward from the wheel assemblies during vehicle operation. However, during the shipment and storage, the build-up can take place such that when the vehicles are subsequently operated, a sufficient amount of dirt or foreign matter can sometimes be present to produce some scoring or other damage to the brakes when they are subsequently operated. In order to overcome this problem, the subject invention provides a temporary, disposable cover or shield device 20 which can be applied over the wheel and within the rim area 12 to, in effect, temporarily seal the openings 18 against the entry of dirt and foreign matter.

Figure 1:
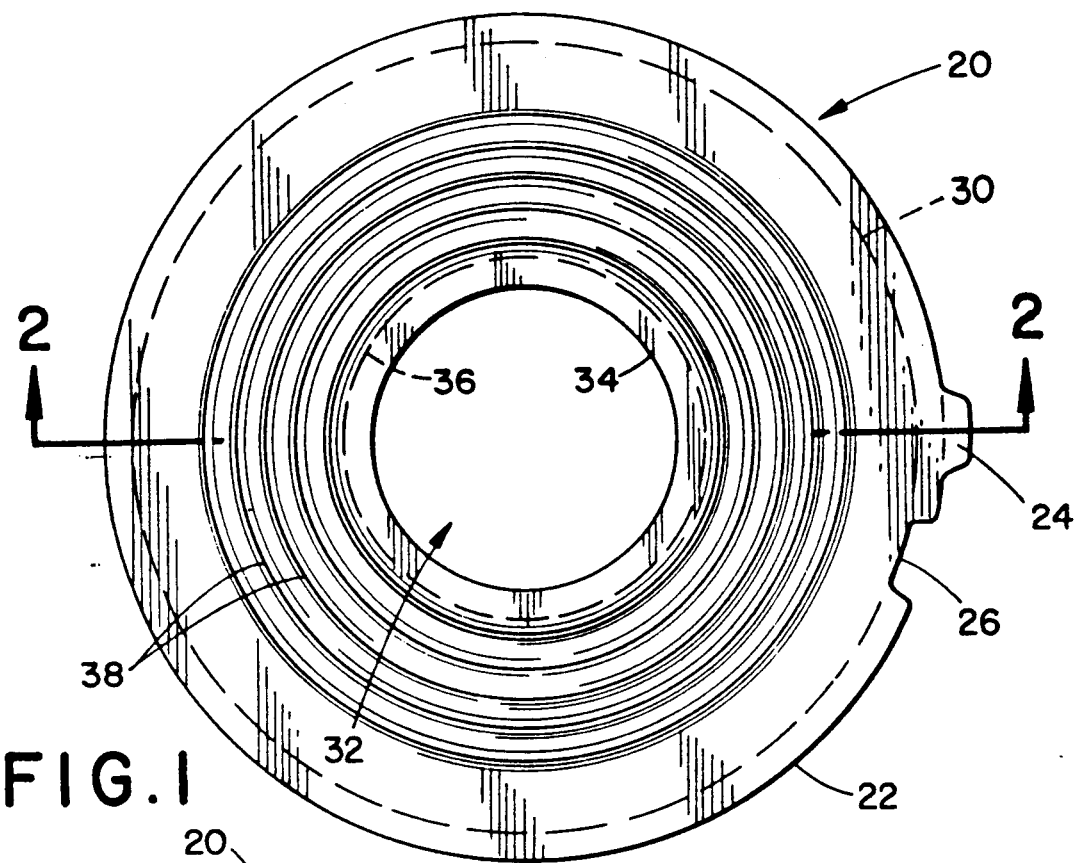
FIG. 1 is a plan view of a wheel cover member formed in accordance with a preferred embodiment of the subject invention.
Figure 2:
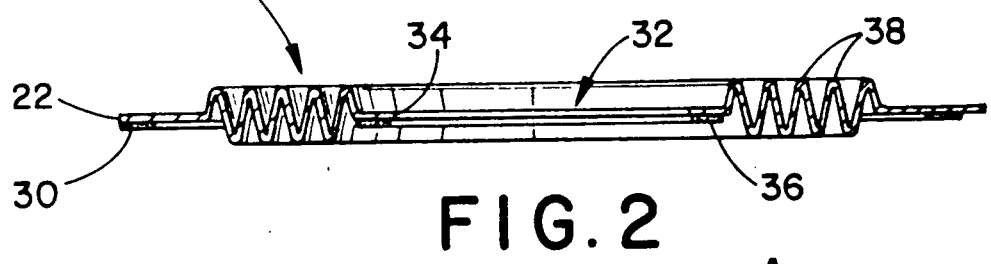
FIG. 2 is a cross-sectional view taken on line 2—2 of FIG. 1.

FIGS. 1 and 2 illustrate a preferred form of the invention. As shown therein, the device generally comprises a circular or disk shaped shield or cover member 20 formed from a relatively thin planar continuous sheet of a suitable plastic such as polyethylene or the like. Preferably the plastic is formulated or treated to be highly weather resistant, including high resistance to ultraviolet radiation, and to remain relatively flexible and crack free throughout extended periods of time.

The outer periphery 22 of the cover is generally sized so as to be closely received within the rim portion 12 of the wheel 10 to generally overlie the entire wheel and all of the openings 18. Preferably, one or more finger tab portions 24 extend radially outward from the periphery of the cover member 20. These finger tab portions are, in the subject embodiment, formed integrally with the main body of the cover and form a continuation thereof. In addition, the periphery is preferably provided with at least one inwardly extending notch 26 sized and arranged so that it can allow the cover to be fitted about wheel balancing weights such as weight 28 illustrated in FIG. 3.

In the preferred embodiment of FIGS. 1 and 2, the wheel cover 20 is arranged to be sealingly affixed to the wheel 10 by a continuous band of suitable pressure sensitive adhesive 30 which extends circumferentially about the cover at or closely adjacent to the outer periphery 22 so as to lie outwardly of the openings 18 when the cover is fixed in position on the wheel 10.

The central portion of the cover 20 is preferably provided with an opening 32 having periphery 34 which is sized so as to extend radially inward beyond the innermost extent of the openings 18. A second circumferential area of pressure sensitive adhesive shown as area 36 is carried on the cover closely adjacent the inner periphery 34 at a location such that the inner peripheral portion of the cover can be firmly affixed to the outer surface of the wheel 10 to seal radially inward of the openings 18.

As best illustrated in FIG. 2, the subject embodiment preferably includes a plurality of circumferentially extending, parallel and closely spaced small corrugations 38 which are formed as discussed in the commonly assigned prior U.S. Pat. No. 4,696,848 for "Surface Protector With Expansible Pocket", which is incorporated herein by reference. By forming these corrugations in the mid-section or intermediate portion of the covers at the location and in the manner illustrated, the central section of the cover can be deflected laterally a substantial distance relative to the plane of the outer periphery 22. This allows the cover to more closely conform to and adequately fit a variety of different wheel types and sizes while performing its shielding or covering function. Thus, it is possible to use the same cover, shape and design for many different wheel configurations. Additionally, it should, of course, be understood that the number and type of corrugations can be varied to allow the extent of lateral shifting of the center portion to be varied as needed or desired.

As explained and discussed in the prior commonly owned U.S. Pat. Nos. 4,588,627; 4,544,593; 4,469,732; and 4,420,520 the covers of this invention can be manufactured, stored and shipped in aligned stacks or packets for subsequent use. Thus, an aligned stack of covers can be provided and the covers individually removed from the stack as needed. For this purpose, the side of the cover which does not have adhesive applied thereto can be treated with a release agent such as a silicone polymer to assure that the pressure sensitive adhesive does not bond to the adjacent cover in the aligned stack.

It should also be understood that various indicia and installation and removal instructions can be printed directly on the cover members if desired.

Figure 4:
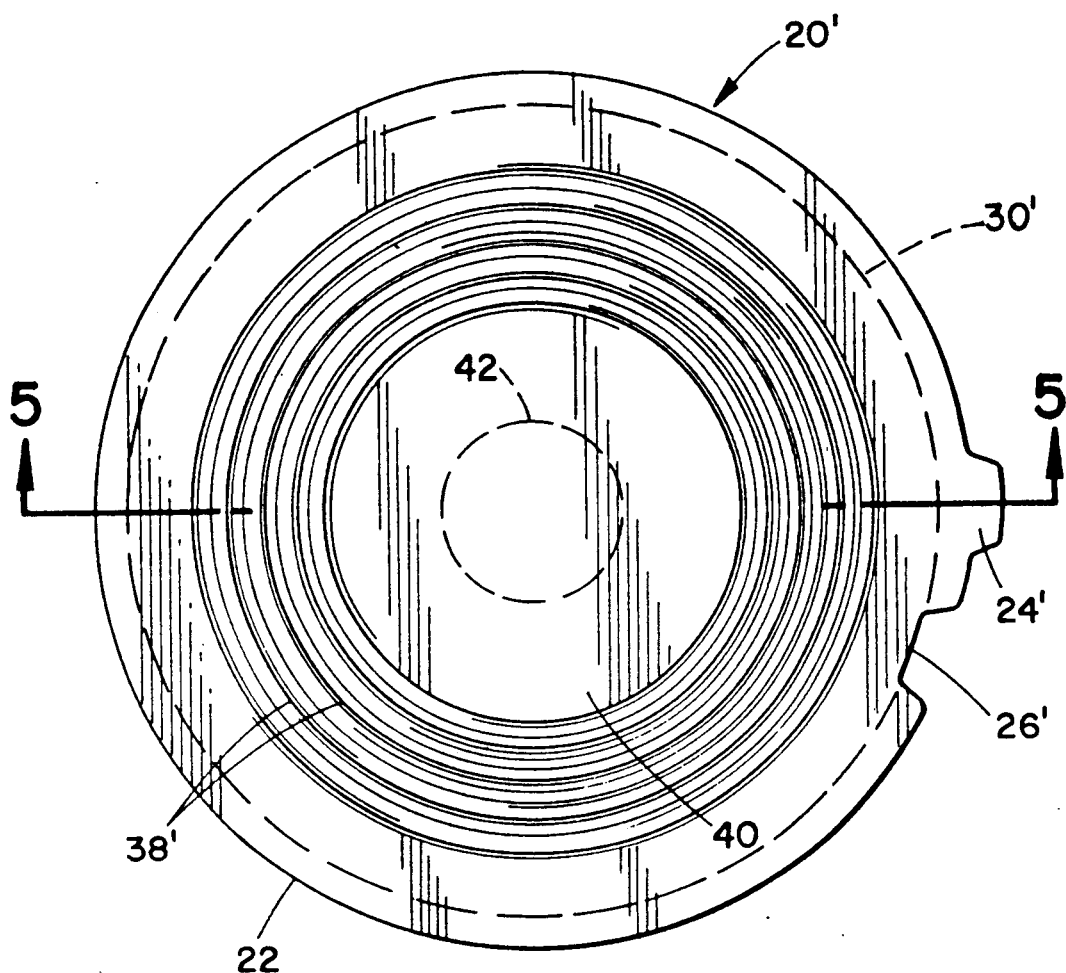
FIG. 4 is plan view of a modified form of wheel cover formed in accordance with the invention.
Figure 5:
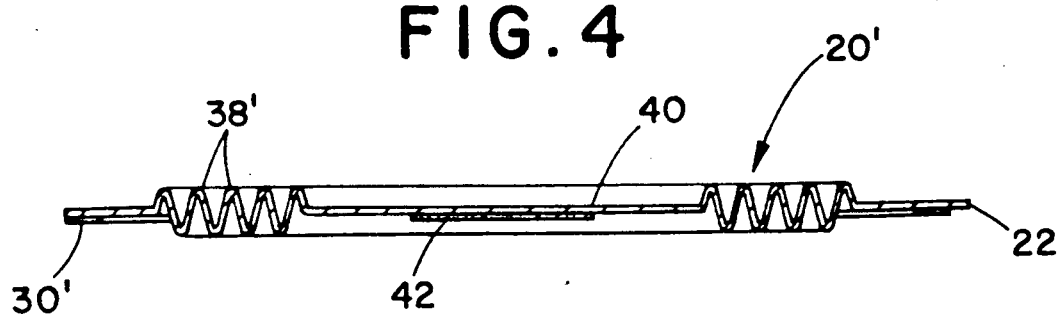
FIG. 5 is a cross-sectional view taken on line 5—5 of FIG. 4.
Figure 6:
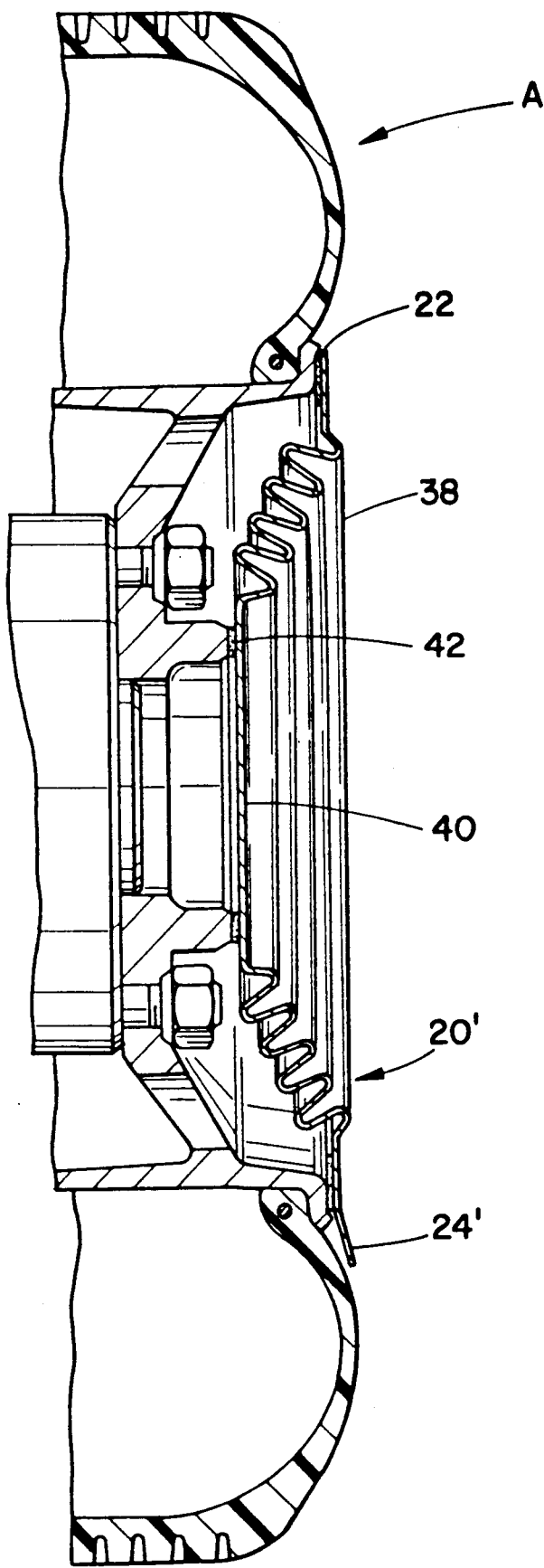
FIG. 6 is a cross-sectional view like FIG. 5 but showing the wheel cover in an expanded and installed condition.

FIGS. 4 and 5 illustrate a modified form of the invention. In this modification the same numerals have been used to identify the sam parts and the prior description of the part so identified is to be taken as equally applicable unless otherwise noted. In particular, the embodiment of FIGS. 4 and 5 has a solid central section 40 which does not include the previously discussed opening 32. In this embodiment, however, it is not necessary to have a central ring of adhesive because the outer ring effectively seals entirely over the openings. It is, of course, possible to have a central ring of adhesive such as shown at 42 to cause the cover to be firmly affixed and more permanently attached if desired. Additionally, the embodiment of FIGS. 4 and 5 illustrates the use of the corrugation section in an area closely adjacent the center of the cover so that a significant central deflection can be provided to handle a center wheel hub or the like. FIG. 6 shows the embodiment of FIG. 4 and 5 installed on a wheel A with the center portion of the cover deflected or expanded into engagement and connection with the hub or center portion of the wheel.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed:

1. A protective cover for installation to a vehicle wheel to prevent dirt, dust or foreign substances from entering through the wheel into brake assemblies carried by the wheel, said cover comprising:
   a relatively thin, flexible and impervious sheet of plastic film having a circular periphery of a size to overlie said wheel,
   a strip of pressure sensitive adhesive applied circumferentially of said sheet for permitting said cover to be releasably affixed to said wheel;

an integral, radially extending finger tab portion located on the circular periphery of said sheet outwardly of said pressure sensitive adhesive; and, at least portions of said sheet radially inwardly of said pressure sensitive adhesive being provided with a plurality of closely spaced relatively small corrugations in a predetermined pattern to allow the at least portions to be deflected laterally of the plane of the periphery of said sheet to allow said cover to conform more closely to surface irregularities on the wheel to which the cover is ultimately affixed.

2. The cover as defined in claim 1 including pressure sensitive adhesive located centrally of said sheet.

3. The cover as defined in claim 1 wherein said plastic film is highly weather resistant and resistant to ultraviolet radiation.

4. The cover as defined in claim 1 wherein a plurality of said covers are arranged in aligned, stacked relationship.

5. The cover as defined in claim 1 wherein said cover is formed from plastic film having a thickness in the range of 4 to 6 mil.

6. A protective wheel cover article for application to the wheel of an automotive vehicle radially inwardly of the tire to prevent entry of foreign matter through openings in the wheel into the vehicle brakes during shipment and storage of the vehicle, said cover article comprising:

an imperforate circular disk of relatively thin, flexible plastic film having an outer periphery located at a diameter sufficient to overlie said wheel;

at least one finger tab integral with the body of said disk and extending radially outward from the periphery thereof to facilitate installation and removal of said cover article;

pressure sensitive adhesive located about the periphery of said disk at a location for adhesive engagement with the wheel closely adjacent the tire;

at least one recess formed radially inwardly of the periphery of the disk for allowing said cover article to be fitted about a wheel balancing weight installed on the wheel to which said cover is affixed; and, a plurality of closely spaced corrugations extending circumferentially of said disk for permitting a central portion of said disk to be deflected laterally.

7. A protective wheel cover article as defined in claim 6 with pressure sensitive adhesive located central of said disk.

8. A protective cover for installation to a vehicle wheel to prevent dirt, dust or foreign substances from entering through openings in the wheel into brake assemblies carried by the wheel, said cover comprising:

a relatively thin, flexible, dirt impervious planar sheet of plastic film having a circular outer periphery sized to substantially cover said wheel;

a plurality of closely spaced, relatively small corrugations formed in said sheet and extending about said sheet in a circular pattern spaced radially inwardly of said outer periphery to permit the central portion of said sheet to be selectively deflected laterally of the plane of said periphery; and, pressure sensitive adhesive carried by said sheet in a first circular area which is generally concentric with said outer periphery, said first area lying radially outwardly of said corrugations.

9. A protective cover as defined in claim 8 further including a second circular area of pressure sensitive adhesive located radially inwardly of said corrugations.

10. A protective cover as defined in claim 9 further including a circular opening formed radially inwardly of said second circular area of pressure sensitive adhesive.

11. A protective cover as defined in claim 8 including a finger tab extending radially outwardly from the outer periphery of said sheet.

12. A protective cover as defined in claim 11 wherein said finger tab is an integral portion of said sheet and further including at least on notch formed to extend radially inwardly from the periphery of said sheet for allowing said sheet to be fitted about a wheel balancing weight applied to the wheel on which said sheet may be affixed.

13. A protective wheel cover article for application to the wheel of an automotive vehicle radially inwardly of the tire to prevent entry of foreign matter through openings in the wheel into the vehicle brakes during shipment and storage of the vehicle, said cover article comprising:

an imperforate circular disk of relatively thin, flexible plastic film having an outer periphery located at a diameter sufficient to overlie said wheel;

at least one finger tab integral with the body of said disk and extending radially outward from the periphery thereof to facilitate installation and removal of said cover article;

pressure sensitive adhesive located about the periphery of said disk at a location for adhesive engagement with the wheel closely adjacent the tire; at least one recess formed radially inwardly of the periphery of the disk for allowing said cover article to be fitted about a wheel balancing weight installed on the wheel to which said cover is affixed; and, an opening formed centrally of said disk with a plurality of closely spaced corrugations surrounding said opening and pressure sensitive adhesive adjacent the periphery of said opening.

14. A protective wheel cover as defined in claim 13 including a plurality of corrugations formed in said disk about the center thereof to permit said center to be deflected laterally relative to the outer periphery.

* * * * *